United States Patent [19]

Nikkel et al.

[11] Patent Number: 5,170,849
[45] Date of Patent: Dec. 15, 1992

[54] GUIDANCE CONTROL SYSTEM FOR FARM TRACTOR/IMPLEMENT COMBINATION

[75] Inventors: Lee F. Nikkel; Eugene H. Schmidt, both of Madrid; Marlin W. Unruh, Grant, all of Nebr.

[73] Assignee: A.I.L., Inc., North Platte, Nebr.

[21] Appl. No.: 685,391

[22] Filed: Apr. 11, 1991

Related U.S. Application Data

[63] Continuation-in-part of Ser. No. 533,018, Jun. 4, 1990, Pat. No. 5,025,866.

[51] Int. Cl.$^5$ ............................................. A01B 63/10
[52] U.S. Cl. ...................................... 172/6; 180/131; 180/79.1; 364/424.07; 280/776
[58] Field of Search .......................... 172/5, 6, 233, 26; 280/776; 104/244.1; 180/79, 131; 171/47; 364/424.07

[56] References Cited

U.S. PATENT DOCUMENTS

| | | | |
|---|---|---|---|
| 3,512,587 | 5/1970 | Slader | 172/686 |
| 3,776,316 | 12/1973 | Eberhart | 172/6 |
| 4,031,962 | 6/1977 | Ellinger | 180/79.1 |
| 4,077,488 | 3/1978 | Bennett, Jr. et al. | 172/6 |
| 4,266,616 | 5/1981 | Mueller, Jr. | 172/7 |
| 4,463,811 | 8/1984 | Winter | 172/86 |
| 4,607,716 | 8/1986 | Beck | 172/6 |
| 4,640,365 | 3/1987 | Schmidt | 104/244.1 |
| 4,734,683 | 3/1988 | Howell, Jr. et al. | 280/776 |
| 4,835,691 | 5/1989 | Rotam et al. | 172/6 |
| 4,923,015 | 5/1990 | Barsby et al. | 172/4.5 |
| 4,923,017 | 5/1990 | Meek et al. | 172/466 |
| 4,930,581 | 6/1990 | Fleischer et al. | 172/191 |
| 5,025,866 | 6/1991 | Schmidt et al. | 180/131 |
| 5,031,704 | 7/1991 | Fleischer et al. | 180/131 |
| 5,031,705 | 7/1991 | Clemens | 172/6 |
| 5,040,613 | 8/1991 | Dodd et al. | 172/5 |

OTHER PUBLICATIONS

Sunco, "Acura Trak" brochure, Feb. 1989.
Sakup, "Autoguide" Guidance System brochure, Dec. 1989.
HR Manufacturing, "Navigator" Guidance System Brochure, Jun. 1989.
Lincoln Creek Manufacturing, "The Guide Quick Hitch" Brochure, Sep. 1981.
Fleischer Manufacturing, "Buffalo Scout" Brochures Dec. 1988.
Orthman, "MP III Tracker" Brochure, Sep. 1989.
Orthman Product Catalog, Sep. 1988.

Primary Examiner—Randolph A. Reese
Assistant Examiner—Spencer K. Warnick
Attorney, Agent, or Firm—Welsh & Katz, Ltd.

[57] ABSTRACT

A guidance system for the combination of a farm tractor and trailing implement, wherein the guidance system is of the type where the implement is attached to a 3-point hitch mechanism that can be angularly oriented in a horizontal plane by extending one side relative to the other to change the angle of the cross bar relative to the drive axle of the tractor. An alternate embodiment operates with an implement that is attached with a single pull hitch. The system includes circuitry which provides for warning of improper operation and delay means for sounding a warning, provides correction of the position of the implement without over-shooting or hunting by the system. The system utilizes Hall effect sensors for determining the angular position of a wand and or either the implement tool bar or the hitch that is attached to the 3-point hitch of the tractor.

69 Claims, 6 Drawing Sheets

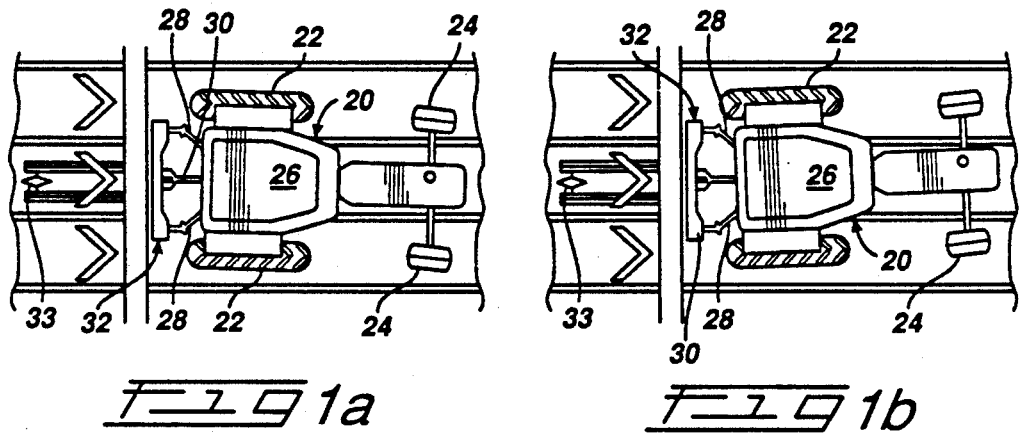
FIG 1a
FIG 1b
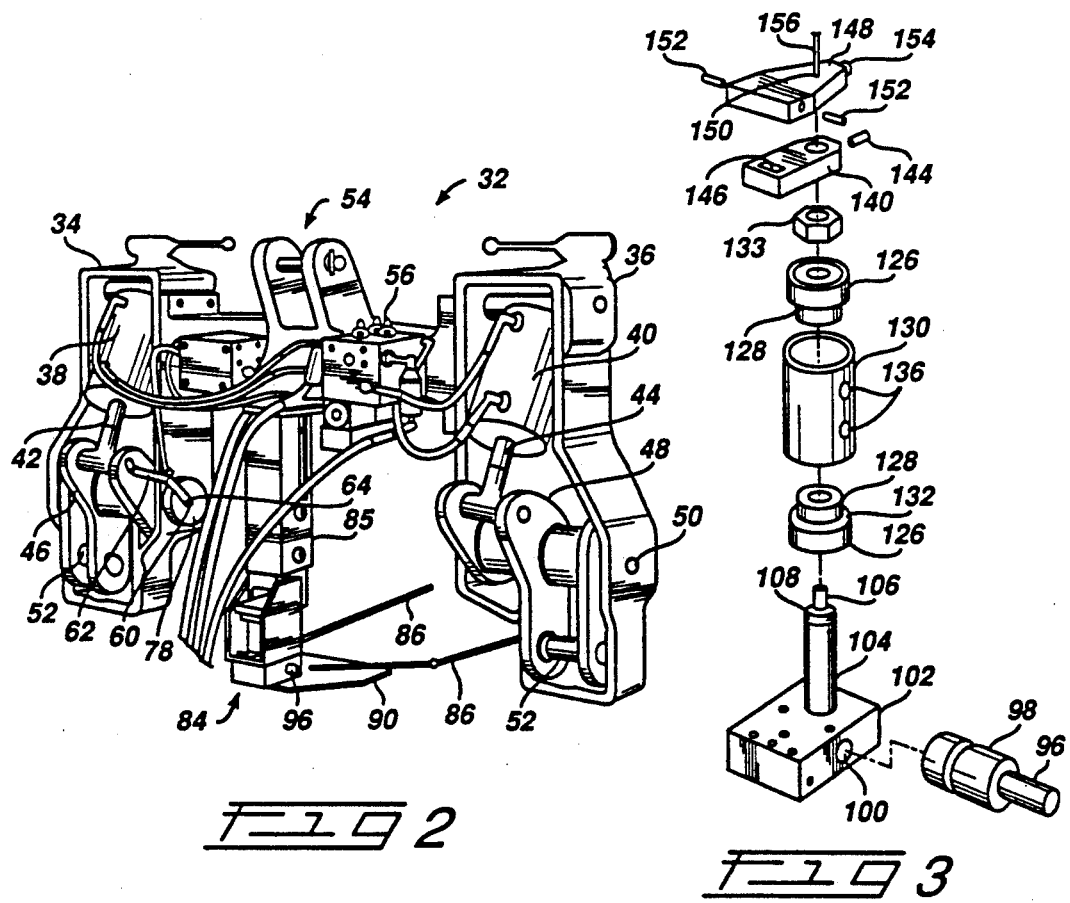
FIG 2
FIG 3

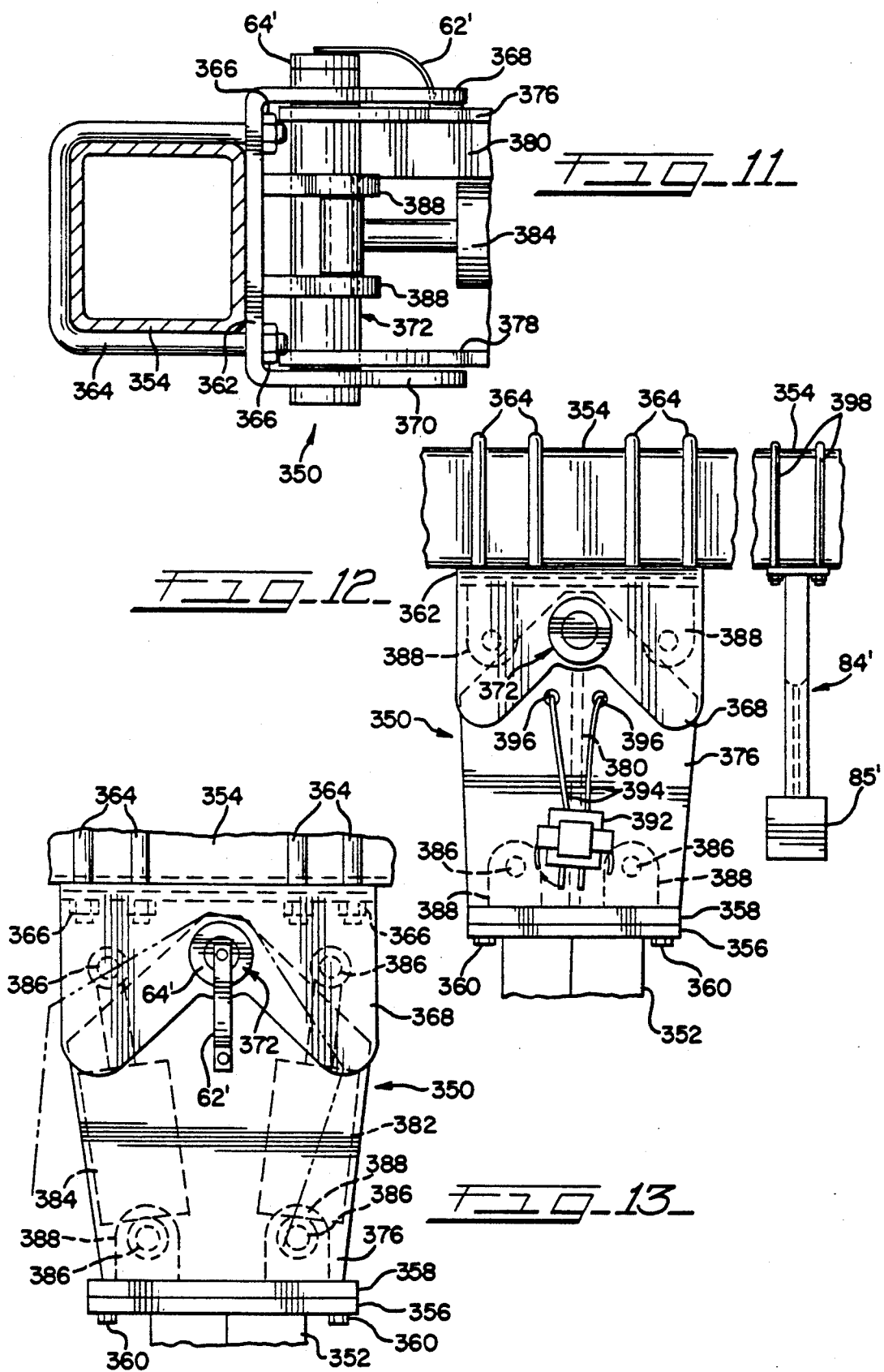

GUIDANCE CONTROL SYSTEM FOR FARM TRACTOR/IMPLEMENT COMBINATION

This is a continuation-in-part of application Ser. No. 533,018, filed Jun. 4, 1990, now U.S. Pat. No. 5,025,866 and is assigned to the same assignee as the parent application.

The present invention generally relates to guidance control systems for implements that trail a vehicle and more particularly to a guidance system for a farm implement in combination with a farm tractor.

There has been a continuing desire of operators of farm tractors as well as other vehicles for a guidance control system that would aid the operator in traveling along a desired path through a field more accurately. This continuing desire has resulted in the development of many prior art systems, some of which are more effective and reliable than others. While some guidance systems are more concerned with controlling the tractor itself, a more effective approach is to control the position of the implement relative to the tractor that is pulling it, with the focus being on proper positioning of the implement rather than the tractor itself.

If an operator is cultivating a crop that has already reached a stand, or is applying herbicide or the like, the difficulty does not reside in the operator being able to keep the tractor between the rows without the tractor wheels crushing the crop, but rather keeping the implement from getting too close to the crop which could, in the case of cultivation, result in damage to the roots of the crop by the cultivator blades. In the case of applying herbicide or the like, it is obviously desirable to have the herbicide applied as close to the crop as possible so that an effective kill of the weeds can be accomplished without damaging the plants.

Systems have been developed which have the implement attached to the tractor by a mechanism which effectively lengthens one side relative to the other operating in combination with a stabilizing wheel which is a disc-like wheel that is located rearwardly of the hitch and attached to the implement and which provides a fulcrum about which adjustment of the draw bar makes the necessary corrections. While prior art systems have utilized this basic mechanical concept in their operation, the control of the implement relative to the tractor is done in different ways. The control mechanisms which control the operation of the mechanical portions of such systems may include sensing wands and the like, which generally control the operation of hydraulic cylinders and these control mechanisms also operate in different ways.

While the use of a wand mechanism associated with the implement which is dragged along the ground is a common means for sensing the relative position of the implement to the row, the use of only the wand sometimes does not result in totally acceptable or reliable performance. Moreover, the wand is generally pivotally mounted on the implement and its angular position is sensed for the purpose of providing a corrective signal for controlling the guidance system and various means have been used to sense this position, including infrared emitters and detectors, as well as potentiometers. Infrared sensors tend to become soiled because of the dusty conditions in the field and potentiometers tend to wear out in a relatively short time. Additionally, an infrared radiation control scheme generally requires additional circuitry for providing a usable corrective signal which increases the manufacturing costs.

Accordingly, it is a primary object of the present invention to provide an improved guidance system for the combination of a farm tractor and trailing implement, wherein the guidance system is of the type where the implement is attached to a 3-point hitch mechanism that can be angularly oriented in a horizontal plane by extending one side relative to the other to change the angle of the cross bar relative to the drive axle of the tractor.

Another object of the present invention is to provide such an improved guidance system which is useful for operation with an implement that is attached with a single pull hitch.

Another object of the present invention is to provide an improved guidance system of the foregoing type which utilizes a wand sensor in addition to a sensor which detects the angular position of the hitch mechanism and uses both signals for generating a correction signal for correcting the angular position of the hitch mechanism to achieve proper guidance.

Yet another object of the present invention is to provide an improved guidance system which has superior guidance capability as a result of the superior design and capability of the electrical control circuitry.

Still another object of the present invention is to provide an improved guidance system of the foregoing type which utilizes magnetic interaction for detecting the lateral position of a wand relative to the desired path, as well as the angular position of the hitch mechanism cross bar.

Another object of the present invention is to provide such an improved guidance system of the foregoing type which utilizes Hall effect sensors in its design and construction, which is substantially insensitive to the presence of dust and moisture, thereby contributing to reliable and efficient operation. A related object lies in the provision of such Hall effect sensors providing a usable output signal for the circuitry that controls the operation of the guidance system. Another related object lies in the provision of such Hall effect sensors being extremely small, which enables the sensor structure to be compact in size.

Yet another object of the present invention is to provide an improved guidance system of the above type which reliably performs corrective action without experiencing over-correction and thereby necessitating reverse correction, otherwise known as hunting.

A related object lies in the provision of utilizing the combination of signals from the wand sensor and hitch sensor to initiate corrective action and once initiated, changing the sensitivity during correction to terminate the correction action before centering is accomplished to thereby employ momentum of the hydraulic system to achieve centering without requiring reverse correction.

Other objects and advantages will become apparent from the ensuing detailed description, while referring to the attached drawings, in which:

FIGS. 1A and 1B are greatly simplified top views of a tractor traveling down a row and illustrating the operation of the hitch mechanism that is associated with the guidance system of the present invention, and also showing a trailing implement that is equipped with a stabilizing disc;

FIG. 2 is a perspective view of the rear of the mount hitch that is attached to a tractor and to which the implement is to be attached, and also illustrating the wand that extends rearwardly of the tractor when the mount hitch is installed;

FIG. 3 is an exploded perspective of the structure of the wand position sensor portion of the apparatus of the present invention;

FIG. 11 is a side elevation of another embodiment of the present invention that is useful for a pull hitch implement, and the side elevation illustrates a portion of the implement with a portion of the apparatus of the other embodiment;

Figure 4:
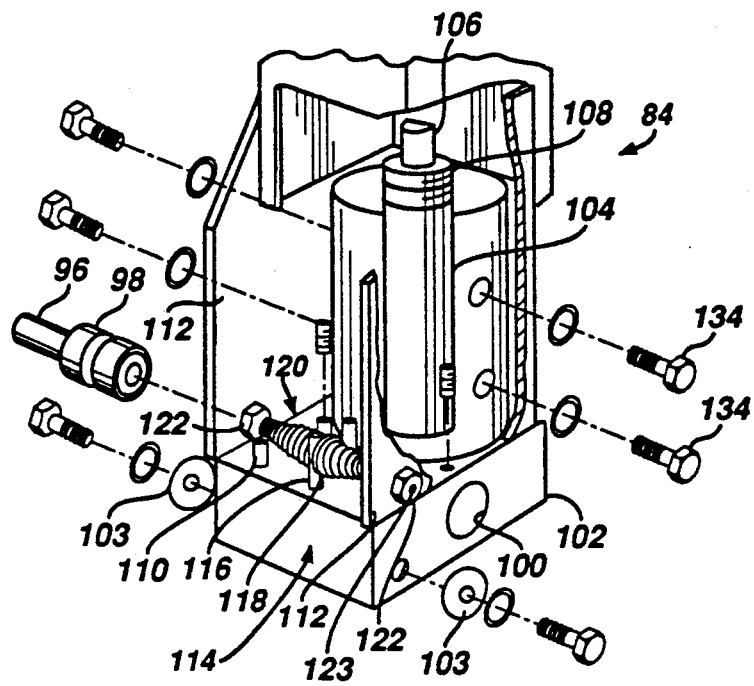
FIG. 4 is a partially exploded perspective of the wand sensor assembly and is an enlargement of a portion of the perspective shown in FIG. 2.
Figure 5:
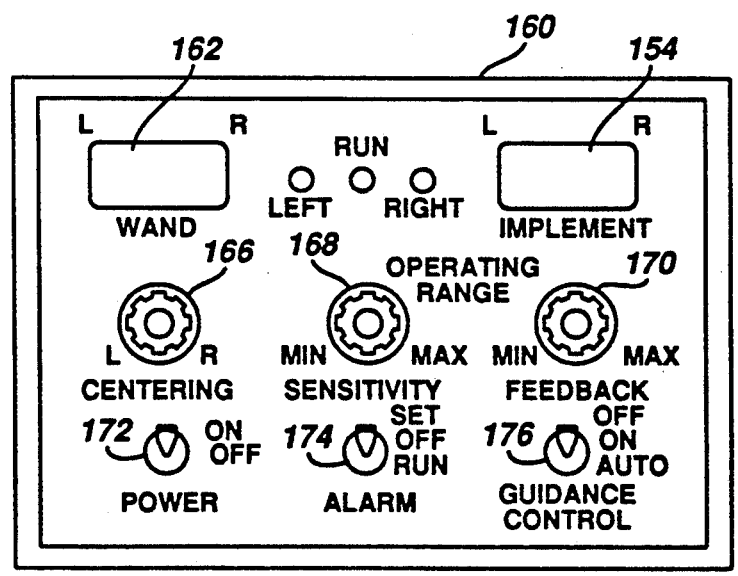
FIG. 5 is a front plan view of the operator console portion of the present invention.

FIG. 12 is a top plan view of the embodiment shown in FIG. 11, with portions removed, but illustrating some of the hydraulic components and the wand sensor of the apparatus; and FIG. 13 is another top plan view of the embodiment shown in FIGS. 11 and 12, with portions removed, and particularly illustrating the hydraulic cylinders, and another angular position of the pull hitch relative to the implement tool bar also being shown in phantom.

DETAILED DESCRIPTION

Broadly stated, the present invention is directed to a guidance control system for farm tractors in combination with a trailing implement although the guidance system is not limited to such a particular application. It is contemplated that the guidance control system could be used with vehicles other than farm tractors and could have general applicability to any such vehicle that would utilize a mounting hitch to which some type of implement could be attached and where angular positioning of the implement is desired.

However, the system is particularly useful in guiding implements that trail a tractor such as those used in row crop farming. The system includes a hitch that is mounted to a 3-point tractor hitch and the hitch of the guidance system is adapted to move in a manner whereby each side of the hitch may be extended or retracted, with the extension of one side resulting in retraction of the other, thereby changing the angle of the guidance system hitch relative to the angle of the tractor hitch. Stated in other words, the angle of the guidance system hitch may be varied relative to the direction of the axle of the rear tractor drive wheels. An alternate embodiment of the system is adapted for use with implements that have a trailing hitch, rather than a 3-point hitch, and the same principles apply.

Referring to the drawings, and particularly FIGS. 1A and 1B, there is shown a tractor, indicated generally at 20, which has rear drive wheels 22 and front wheels 24 for steering the same. Immediately behind the cab 26 is a 3-point tractor hitch comprised of outer draft links 28 and a center link 30 for mounting implements. The hitch of the guidance system, indicated generally at 32, is connected to the hitch elements 28 and 30 of the tractor hitch and the implement is then attached to three points of the guidance system hitch 32.

As can be appreciated from FIG. 1A, if the tractor is angled to the right relative to the direction of the rows, the upper or left side of the hitch 32 is extended with the lower or right side retracted so that the angle of the guidance system hitch 32 is more perpendicular to the orientation of the rows. As shown in FIG. 1B, if the tractor is angled to the left relative to the rows, the lower side of the hitch is extended while the upper is retracted and this also maintains the guidance system hitch 32 in the generally perpendicular position. Regardless of whether the upper or lower sides of the hitch is extended or retracted, the center of the hitch has a relatively constant length during operation.

The diagrammatic representations of FIGS. 1A and 1B also show a stabilizing disc 33 that is mounted to the implement and located some distance from the system hitch 32. This stabilizing disc 33 penetrates into the soil and acts as a fulcrum about which the implement can be angled. Stated in other words, when the angle of the hitch 32 is changed, it slightly changes the angular orientation of the stabilizing disc 33 and causes the implement to be transversely moved during forward movement to bring the implement back to center along the desired path of movement. It should be understood that while it is preferred that a stabilizing disc 33 be used, a stabilizing wheel may used. It may be possible that some implements may not require a stabilizing disc at all, provided that the natural operational characteristics of the implement be such that the implement would tend to rotate in the same way as if a stabilizing disc were present.

Thus, with the corrections that are made by the guidance system, the tractor does not have to be precisely maintained along the desired path and the system will maintain the implement in the center of the rows. It should also be appreciated that when the angle of the guidance system hitch is changed relative to the tractor hitch, it is also important that the arms of the tractor hitch be adjusted so that they can move from side to side by a predetermined amount, preferably about 10 inches. This permits angulation of the system hitch to result in the centering movement of the system hitch as well as the rear portion of the tractor hitch relative to the lateral position of the tractor itself. Such adjustment generally involves the removal of sway blocks, which when they are present, restricts the transverse movement of the tractor hitch. However, the removal of such sway blocks should only be done for the tractor hitch in the lowered or working position. Upper sway blocks should be present to keep the tractor hitch and attached implement from banging from side to side during transport or the like.

With respect to the alternate embodiment for use with a trailing hitch, the implement hitch arm is attached to a single preferably center hitch of the tractor and rotates about the hitch pin. By changing the angular position of the trailing hitch arm relative to the transverse implement tool bar, the same transverse centering movement is obtained.

An advantage of such a guidance system is that more accurate operation can be achieved with less skill and effort. Among other advantages, relatively lesser skilled operators can do the work, and the quality of the job is not appreciably affected.

Referring to FIG. 2, which shows the guidance system hitch 32 from the rear end, i.e., the end which attaches to the tractor, the hitch 32 has a left side casting 34, a right side casting 36, which respectively contain left and right hydraulic cylinders 38 and 40. The cylinder 38 has an extendable piston 42 whereas the cylinder 40 has a similar piston 44, with each of the pistons being connected to crank arms 46 and 48, respectively, each of which pivots around a shaft such as the right shaft 50, the left not being shown. The crank arms 48 have a mounting pin 52 for attachment to the tractor hitch. A center clevis, indicated generally at 54, also mounts to the third point of the 3-point tractor hitch. The cylinders 38 and 40 are connected to a hydraulic system, generally contained within the box 56, which is preferably connected to the hydraulic system of the tractor. The hydraulic lines are preferably connected so that extension of one cylinder 38 will result in displacement of fluid from one end of the cylinder and will cause a similar displacement in the opposite cylinder 40 to result in comparable retraction of its piston 44. Movement of the pistons 42 or 44 will rotate the crank arms 46 or 48 around their shafts and by virtue of the connection with clevis pins 52, result in movement of one side or the other toward and away from the tractor to thereby change the angular orientation of the guidance system hitch 32 relative to the tractor.

Figure 7:
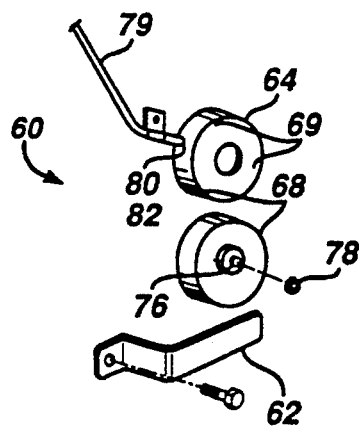
FIG. 7 is an exploded perspective of a portion of the mounting hitch sensor which is also shown in FIG. 2.
Figure 8:
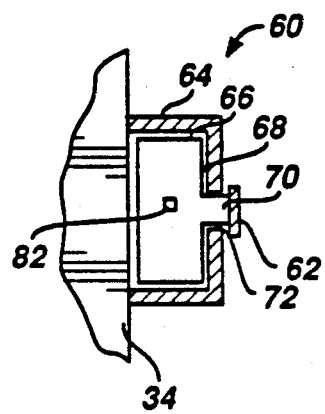
FIG. 8 is a side elevation of a portion of the mounting hitch sensor, shown partially in section.

To measure the position of the crank arms and thereby the angular orientation of the guidance system hitch 32, a hitch angle sensor mechanism, indicated generally at 60, is provided and it comprises a rotatable arm 62 that is connected to the crank arm and pivots around a sensor mechanism shown in FIGS. 7 and 8. The sensor mechanism includes a stationary outer housing 64 which has an internal recess 66 in which a rotatable rotor element 68 is located. This element has a outer diameter slightly less than the diameter of the recess and a thickness slightly less than the thickness of the recess so that it is free to rotate within the recess. The housing 64 is preferably secured to the side of the left casting 34 by suitable screws 69 located in the outer periphery of the same. The rotor element 68 has a small annular extension 70 which protrudes through a slightly larger diameter aperture 72 in the housing 64 and has a threaded aperture 76 to which a bolt 78 attaches the lever arm 62.

The housing 64 has an electrical conductor 79 extending therefrom and it is connected to a Hall effect sensor 80 that comprises a sensor element which measures changes in magnetic flux relative to the head and generates a signal that is proportional to the magnitude of such flux. The rotor 68 has a small relatively strong magnet 82 located in a suitable recess therein and preferably epoxy thereto and flush with the outer periphery. While not critical, the size of the magnet is approximately $\frac{1}{4} \times \frac{1}{4} \times 0.6$ inch, with opposite ends being magnetic north and south.

From the foregoing description, it should be appreciated that as the rotor 68 is turned by action of the crank arm and the lever arm 62 rotating, the Hall effect sensor 80 will detect changes in the rotation and generate an electrical output that is applied to the circuitry to be described via conductor or line 78.

Figure 6:
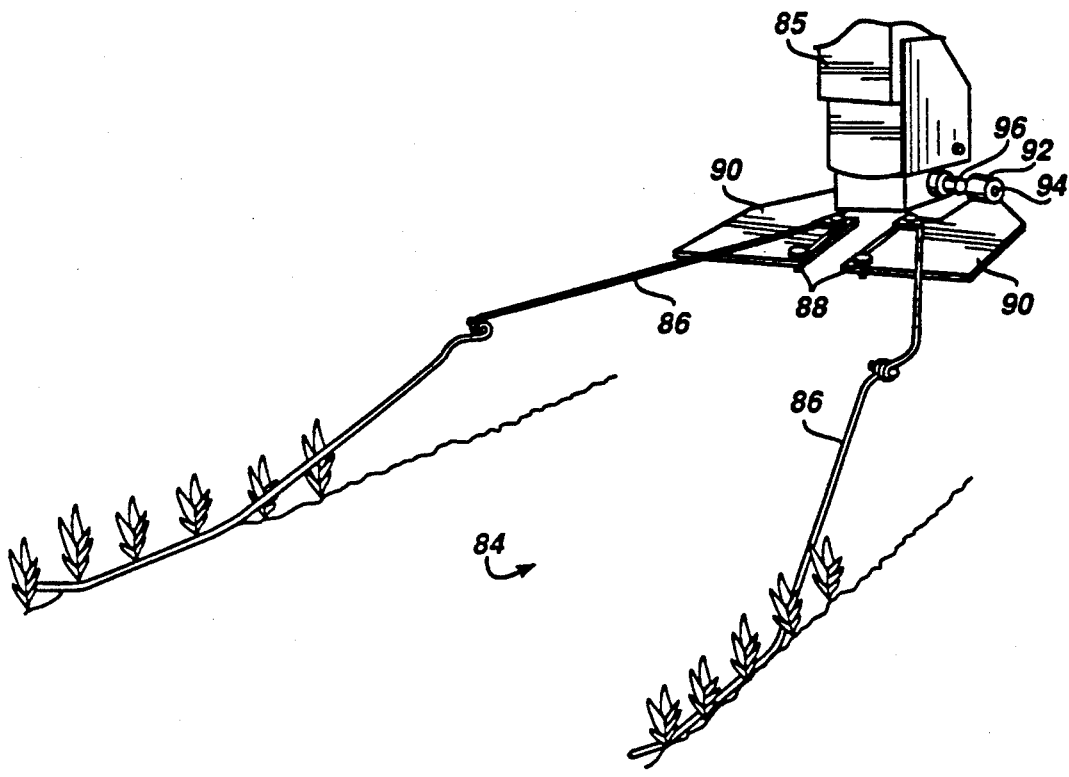
FIG. 6 is a perspective of the structure of the wands and associated support structure.

As previously generally mentioned, the guidance system of the present invention also includes a wand assembly, indicated generally at 84, and which is shown in FIGS. 2, 4 and 6. As shown in FIGS. 2 and 6, the wand assembly 84 is supported by a center housing 85, but it should also be appreciated that it is not essential that the center housing 85 be present. The wand assembly 84 may be mounted laterally of the center by one or two rows if desired. In this regard, such an off center mounting may be desirable for implements which require the use of the tractor power takeoff, which is located in the center. It is also useful for the alternate embodiment illustrated in FIGS. 11-13.

The wand assembly 84 has a generally wishbone shape and comprises two wand arms 86, which extend rearwardly of the guidance system hitch 32. These wands can be vertically adjusted and the spacing between them can also be adjusted to correspond with the width of rows of the crop or the like, which they are intended to detect. The distance between the two wands can be adjusted by varying the location of bolts 88 located in horizontally oriented plates 90 which preferably have an end portion 92 and a sleeve 94 which fits on a shaft element 96. The plates 90 therefore are free to pivot vertically around the shaft 96. The shaft elements 96 have an enlarged end bushing portion 98 which are force fit into suitable apertures 100 located in a pivotal block 102. This block also has off centered cam elements 103 suitably attached thereto which can be adjusted for the purpose of changing the angular orientation of the plates 90 when the implement is raised during traveling or turning around in the field. This results in the wand arms 86 being elevated as the implement is elevated.

The angular position of the wand arms relative to the guidance system hitch 32 is detected by the structure to which the block 102 is mounted. This block 102 is adapted to rotate around a shaft 104 that is fixedly attached thereto and which has a reduced diameter end portion 106 and threads 108 adjacent thereto on the larger shaft portion. Referring to FIG. 4, the block 102 has end pins 110 frictionally set in apertures thereof which, during rotation, limit movement thereof by these pins 110 contacting one or the other of side plates 112. There is a spring biased centering mechanism, indicated generally at 114, which returns the wands to a center position if they are not in contact with crops, rows or the like. This centering mechanism includes a pair of pins 116 to which washers 118 bear. A pair of springs 120 are provided which bear against the washers 118 and against respective nuts 122. The centering mechanism includes a shaft 123 having an enlarged center portion which fits between the pins 116 when the mechanism is centered. The shaft 123 extends through the side plates 112 and a threaded end portion is secured by a nut 124 on the outside. The center portion is larger than the inside diameter of the washers so that rotation of the block 102 results in the pins bearing against the washer on the side to which the block 102 is being moved and compressing that spring. The center portion retains the other washer 118 and the spring associated with that side does not become compressed unless the block is pivoted in the opposite direction.

By adjusting the nuts 122 and 124, the bolt 123 can be moved in the axial direction, which necessarily moves the center position. By so doing, the rest position of the wand arms can be adjusted. The shaft 104 is rotatable in a pair of bushings 126 which have a reduced diameter portion 128 that fit within a sleeve 130, with the annular face between the two diameter sections, shown at 132, bearing against the respective ends of the sleeve 130. A nut 133 is threaded upon the threaded portion 108 to hold the mechanism together. The sleeve 130 is secured within the housing by threaded bolts 134 which extend through suitable apertures in the side plates 112 and engage threaded openings 136 in the sleeve.

To detect the angular position of the wands, an elongated block 140 is provided and includes an aperture 142 which fits over the end 106 of the shaft 104 and is secured by a set screw 144 that is threaded into an aperture (not shown) in the block 140. At the opposite end of the block 140 is a magnet 146 that is contained within a recess and is preferably the same size and type of magnet as the magnet 82. Thus, as the block 102 rotates with rotation of the wands 86, the block 140 similarly rotates and it is in close proximity to a stationary block 148 that is secured by set screws 152 located on opposite sides within the housing 84. The far end (as shown) of the block 148 contains an extension 154 which fits within an aperture in the rear face of the enclosure. Thus, by adjustment of the opposing set screws 152, the block may be adjusted left and right relative to the pivot point defined by the extension 152 for the purpose of centering the wand detection sensor 150. A pair of lock nuts (not shown) are applied to the bolt 123 on the outside of the housing 85 to secure the bolt position. The wand detection sensor 150 is also preferably a Hall effect head that is located within a groove in the undersurface of the block 148 and the electrical conductor 156 from the Hall effect sensor extends upwardly to the electrical circuitry to be described.

The guidance system includes an operator's console 160 that preferably is located in the tractor cab and it includes a bar graph meter 162 for the wand position and another bar graph indicator 164 for the hitch orientation. There is also a knob 166 for centering the implement during operation, a sensitivity control knob 168 for adjusting the quickness of correction as a function of detected changes in the orientation of the wand and/or crank arm, a feedback adjustment knob 170 which controls the degree of influence from the wand sensor relative to the hitch angle sensor, a power on and off switch 172, alarm switch 174 and a guidance control switch 176 which effectively controls the activation of the wand sensor signal that is used to calibrate the system and to turn off the wand sensor during travel from one field to another when the wand may be elevated and would be free to swing back and forth. Obviously, it is not desirable to have the control system make corrections during such time. It should also be understood that some implements may contact the rear tractor wheels when the implement is elevated and it is therefore necessary that the hitch 32 of the guidance system be perpendicular and centered so that such contact will not occur.

Figure 10:
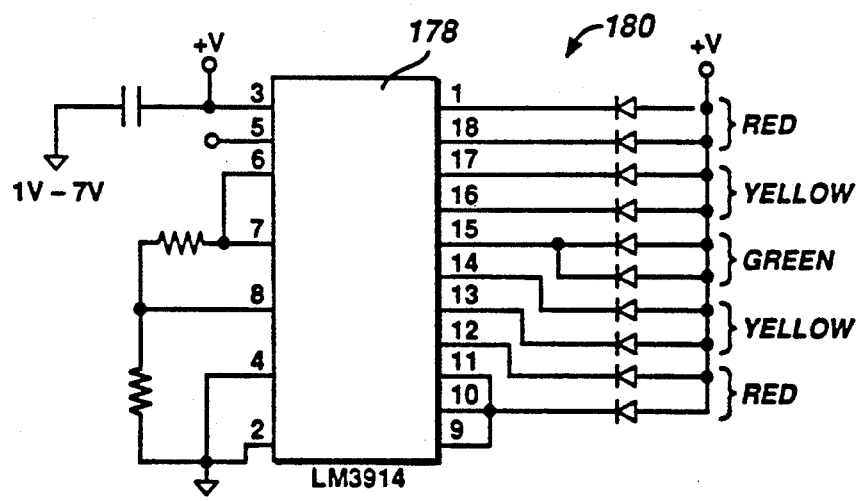
FIG. 10 is also an electrical schematic diagram of one of the bar graph displays of the console.
Figure 9:
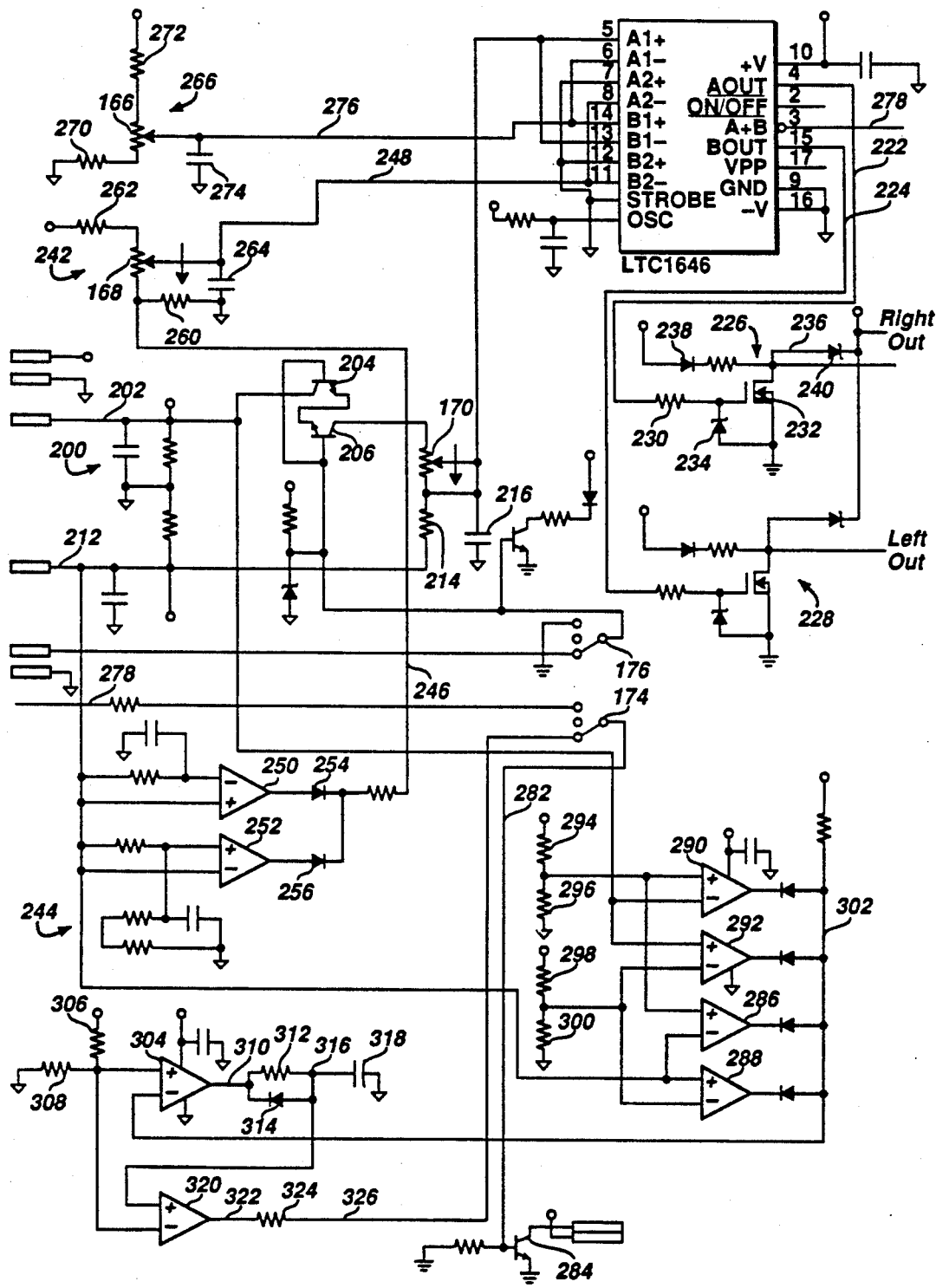
FIG. 9 is an electrical schematic diagram of the major portion of the circuitry associated with the guidance system embodying the present invention.

The signals from the hitch angle sensor and the wand sensor are applied to the circuitry which is located in the console, and also shown in FIGS. 9 and 10. The circuitry generally operates to receive the sensor signals and generate a correction signal, which can also be considered a feedback signal. Other portions of the circuitry detect whether the sensors are sensing that the mechanisms which carry them have traveled the full extent of their range of movement, and warning signals are selectively generated when this occurs. Other portions of the circuitry sense the existence and direction of any change that is occurring with respect to the guidance system hitch 32 angular position, and this detection is used to modify the length of time that a correction signal is being generated. This has the effect of using the momentum of the hydraulics to achieve centering without overshooting or hunting by the system.

With respect to the feedback circuitry, indicated generally at 200, it receives the output voltages from the wand sensor and the hitch angle sensor and provides a feedback output signal that is processed to produce drive signals for activating the solenoid valves for operating the hydraulic cylinders associated with the crank arm mechanisms that move to control the position of the center tube and therefore the implement.

Referring to the electrical schematic diagram of FIG. 9, the voltage from the wand sensor is applied on line 202 that extends to the collector of a transistor 204 the emitter of which is connected to the emitter of a transistor 206 and the collector of transistor 206 is connected to a potentiometer 170. The base of each of the transistors 204 and 206 are connected to a switch 176. The voltage from the hitch angle sensor is input to line 212 that is connected to resistor 214, which in turn is connected to ground through capacitor 216 and to potentiometer 170 and to an integrated circuit 218 via line 220, which circuit 218 operates as a sophisticated comparator device providing digital outputs depending upon the input levels and conditions which will be described. The circuit 218 is a model LTC 1040, manufactured by the Linear Technology Corporation.

The levels of the signal from the wand sensor on line 202 is applied to the bar graph driver circuit 178 shown in FIG. 10, which converts the signal level to light selected light emitting diodes shown generally at 180. The outer two pairs of diodes emit a red light, the adjacent pairs of diodes are yellow and the center pair of diodes are green. When the tractor and implement are centered, the green lights are illuminated and when error is detected in either direction, then the yellow or red lights would be illuminated. The circuitry for the hitch angle sensor is identical and these light emitting diodes are part of the display 162 and 164 of the console 160.

During operation when both the hitch angle sensor and wand sensor are activated, the voltage from each of the sensors, which typically are within the range of approximately 1 vdc to 7 vdc, are added and divided by two by the circuitry defined by potentiometer 170, resistor 214 and capacitor 216. If the potentiometer 170 is adjusted so that the resistance is lowest, then the voltage contribution from the wand is greater than from the hitch angle sensor, and the influence of the feedback circuit 200 is mostly that of the wand sensor. If the potentiometer 170 is adjusted to be approximately midway, then with the preferred values of the potentiometer 170 and resistor 214, the voltage contribution from the wand sensor is approximately preferably twice that of the hitch angle sensor, and with the addition and divide by two operation, results in a near cancellation of the influence of one sensor relative to the other.

In practical terms, if the wand is tracking to the left, the wand sensor will generate a signal that will cause a correction of the crank arm that will result in the wand becoming straight. The influence of the hitch angle sensor is a stabilizing voltage that will neutralize the effects of changes of the wand sensor signal and thereby reduces any "hunting" action that may otherwise occur by operation of the wand sensor itself in the absence of the hitch angle sensor signal.

As previously mentioned, the circuit 218 is a relatively sophisticated comparator circuit which provides outputs for operating the solenoid valves for controlling the hydraulic cylinders for moving the crank arm mechanisms. To this end, circuit 218 has output lines 222 and 224, which respectively extend to solenoid drive circuits 226 and 228, which control the right and left solenoids. Line 222 is connected to right solenoid drive circuit 226 and is connected to a resistor 230 which is connected to the gate of a MOSFET transistor 232 and to a zener diode 234. The transistor 232 is connected to line 236 and provides a high output when the transistor is conducting. An advantage of the use of the MOSFET transistor for providing the output is that there is very little voltage drop across the transistor and very little heat is produced by it during operation. This enables the transistor to be placed in a small protected enclosure and is not exposed to the dirty environment, and heat sinking is not particularly important. A light emitting diode 238 is provided to indicate when the solenoid is energized and may be helpful in troubleshooting the system in case of malfunction. A Schottkey diode 240 provides a clamping function, and zener diode 234 prevents transients from being applied to the gate of transistor 232. Line 236 goes low when transistor 232 is in conduction. The other circuit for the left solenoid is identical and will therefore not be described.

The circuit 218 thus provides output signals to the solenoid drive circuits which results in the hydraulic cylinders being activated to perform adjustment of the crank arm mechanisms and therefore the position of the center tube and the implement attached to the system. The correction signals originate from the feedback circuit 200 as has been previously described.

In accordance with another aspect of the present invention, the solenoid valves that are used are model AMW4D61-12VDC as manufactured by the Wand Flue Company, which are available from Fluid Tech Co. of Kansas City, Mo. The solenoid construction is such that a spool within it must be moved and fluid is present within the chamber having the spool and that fluid must be displaced through a small orifice. The effect of the construction is that the solenoid has a softer operating action which minimizes shock to the system during operation. Also, the cylinders 38 and 40 are model T.K.3502220PA-04 as manufactured by Texas Hydraulics Company of Austin, Tex., and have a 2¼ inch stroke which is sufficient to provide the desired angular arc of approximately 13 degrees. It should be understood that the same cylinders are used in the preferred embodiment shown in FIG. 2 as well as the alternative embodiment shown in FIG. 12.

In accordance with an important aspect of the present invention, the operation of circuit 218 is also a function of other input signals which change the values on which a comparator decision is made to produce an output signal on either of lines 222 or 224. One of the input signals is provided by a sensitivity adjusting circuit 242 which changes the magnitude of the change in the output on line 220 from the feedback circuit 200 which results in an output from the circuit 218. Stated in other words, the size of the window is changed depending upon whether there are changes occurring in the signals produced by the sensors. If there is a change in the signal levels from either the wand sensor or the hitch angle sensor, the window is increased, so that corrective action is started by virtue of the feedback output signal on line 220, but as the correction occurs, the increased window size results in the corrective output signal on line 222 or 224 being terminated sooner, i.e., before it reaches the center position, so that the momentum of the system will bring it toward center and it will more accurately stop at the desired center position without further correction. Were the smaller window still employed, the circuit 218 would not terminate the output signal on line 222 or 224 until the smaller window value was reached, and the momentum of the system would carry it past center, requiring another corrective action in the opposite direction to reach the center position.

It should be appreciated that the sensor output signals result in the production of the output signal on line 220 from the feedback circuit 200 while the smaller window is employed and the enlargement of the window does not occur until the corrective action is triggered by circuit 218. However, once corrective action has begun, a crank arm movement detection circuitry 244 is provided for detecting a change in the hitch angle sensor signal value, and that circuit produces a signal on line 246 that is applied to the sensitivity adjusting circuit 242 which has an output on line 248 which changes the window size.

To detect movement of the crank arm mechanism, the hitch angle sensor signal on line 212 is applied to one input of each of two comparators 250 and 252, with one being applied to the positive input and the other to the negative input. The other input of each of the comparators is provided by the same signal, but delayed by a resistor capacitor combination as shown. The effect of the delay is that any change in the signal level is detected by one of the two comparators 250 or 252, with comparator 250 detecting a rise in the signal level and comparator 252 detecting a falling signal level. The outputs of both comparators 250 and 252 are ORed together via diodes 254 and 256, so that a high level is applied to line 246 if either is triggered.

The sensitivity adjusting circuit 242 comprises a potentiometer 168 together with resistor 260, resistor 262 and capacitor 264. If a high level signal is applied to line 246, a high level signal is provided on line 248 which changes the window size.

Another input that has the capability of changing the decision level of the circuit 218 is a center adjusting circuit, indicated generally at 266. It comprises a potentiometer 166 in combination with resistors 270 and 272 and capacitor 274. This circuit enables the center Value to be adjusted by the operator during operation. The preferred value for the output of this circuit is approximately 4 vdc and this is applied to the circuit 218 via line 276.

The circuit 218 also has an output line 278 which provides a high level signal when either of outputs 222 or 224 are off. Line 278 is connected to a switch 174, which is a three position switch that controls the operation of the buzzer. The upper position is used during calibration of the guidance control system, the lower position is used during running of the system, and a middle position (not specifically shown) is off. During calibration of the system, when the operator is centering the wand sensor and crank arm mechanism, the switch 174 is placed in the upper position, and adjustment of the positioning mechanisms of the sensor can be made, which will result in the buzzer being activated when the sensors are centered. The switch 174 is connected by line 282 to a transistor 284 which activates the buzzer.

In accordance with another aspect of the present invention, the system includes a limit detection circuit which detects whether either the wand as well as the crank arm mechanism has reached nearly to their full extent of its range of movement in either direction. When this has occurred, it is an indication that something is amiss in the operation of the system, particularly if it is continuing. To this end, the hitch angle sensor signal on line 212 is applied to one input of each of comparators 286 and 288, while the wand sensing signal on line 202 is applied to one input of each of comparators 290 and 292. A voltage divider comprises of resistors 294 and 296 provide a low voltage of approximately 2 vdc to comparator 290 and 286, while another voltage divider comprised of resistors 298 and 300 provide a high voltage of approximately 6 vdc to comparators 292 and 288. Thus, when the voltage level from either of these signals drops below 2 vdc or exceeds 6 vdc, at least one of these comparators switches to provide a low signal on line 302, indicating that either the wand or the crank arm mechanism has moved to a position that is beyond the normal operating position, which if sustained, means that the system may not be operating properly.

During normal operation the switch 174 is placed in the lower position, which places a time delay circuit in operation. This circuit is effect to delay the activation of the buzzer for a period of approximately 3 to 5 seconds after initially receiving a signal from the limit detection circuitry on line 302 which indicates that either or both of the wand and crank arms have traveled the full extent of their range of movement in either direction. However, during the operation by an operator, the tractor will reach the end of a row and the tractor must turn to go down other rows. During such turning, the implement will be lifted out of the ground and the wands will then be in the air and will typically move back and forth and travel to the limits of its range of movement. Since the operator knows what is occurring at such time, it may be annoying for the operator to hear the buzzer sound, and it is for this reason, among others, that the time delay circuit is provided.

The true or active signal on line 302 is a low level and it is applied to the negative input of a comparator 304, the other input is provided by a voltage from a voltage divider comprised of resistors 306 and 308. When the low level signal appears on line 302, a high output is produced by the comparator 304 on line 310 which is connected to resistor 312 and to a diode 314, which are connected in parallel to a line 316. Line 316 is connected to ground through capacitor 318 and to the positive input of a comparator 320, the other input of which is supplied by the voltage divider connected to comparator 304. Comparator 320 provides a high level signal on line 322 which is connected to the transistor 284 through a resistor 324, line 326, switch 174 and line 282, and activates the buzzer. The capacitor 318 takes approximately 3 to 5 seconds to charge to a level which switches comparator 320, which is the desired delay. If the signal on line 302 again goes high, indicating that both sensors are with the normal operating limits, comparator 304 will provide a low output on line 310 and the capacitor 318 will be quickly discharged, switching comparator 320 and deactivating the buzzer.

When the switch 176 is placed in either the up or down position, transistors 206 and 204 are switched off, which precludes any output being generated from the feedback circuit 200 resulting from the wand movement, which would occur, for example, if a driver were moving the tractor from one field to another or the like, during which time the implement is raised, and the wands would quite likely be moving around. Obviously, it would not be desirable for the guidance system to be activating the hydraulic cylinders at such time, for it would have no purpose.

With the wand sensor deactivated, the output from the feedback circuit 200 is totally comprised of the voltage from the hitch angle sensor on line 212 through resistor 214. This has the effect of centering the crank arm mechanism with the wands in any position which is desirable when the implement is to be lifted. If it were not centered, some implements may contact the rear wheels of the tractor when they are in their fully elevated positions.

Turning now to the alternative embodiment for a pull hitch application of the guidance system of the present invention, and referring to FIGS. 11, 12 and 13, a hitch mechanism, indicated generally at 350, is adapted to be attached to an implement that is to be pulled by a tractor and the implement has a pull hitch 352 that is attached to a single point hitch of the tractor.

The implement has a transverse main tool bar 354 and the hitch mechanism 350 is attached between the pull hitch 352 and the tool bar 354. The pull hitch 352 has an end plate 356 that abuts an end plate 358 of the hitch mechanism 350 and is bolted thereto by bolts 360. Similarly, the opposite end of the hitch mechanism 350 has an end portion 362 that is attached to the tool bar 354 by a number of U-bolts 364 and associated nuts 366.

The end portion 362 is part of a generally U-shaped frame having upper and lower leg portions 368 and 370 between which a hollow cylindrical sleeve 372 is preferably welded. A short hollow cylindrical boss 373 is welded to the upper side of the leg portion 368 and to the lower side of the leg portion 370 and a shaft 374 extends through the bosses 373 and the sleeve 374 as well as through apertures in upper and lower plates 376, 378 so that rotation of the leg portions 368, 370 relative to the plates 376, 378 can occur. A pin 379 extends through suitable apertures in the upper boss and the shaft 374 to hold the shaft in place. The structure therefore permits changing of the angular relation of the tool bar 354 relative to the pull hitch 352, and enables the guidance system to achieve centering in the same manner as has been described with respect to the preferred embodiment.

To control the angular relation of the tool bar 354 and the pull hitch 352, a pair of hydraulic cylinders 382, 384 are provided and they are attached by pins 386 that extend between ears 388 that are welded to the end portion 362 and end plate 358 as illustrated. The hydraulic system is preferably powered by the hydraulic system of the tractor via lines (not shown) which connect to a 4-way valve 392 mounted on the upper plate 376. Hydraulic lines 394 extend from the valve 392 through apertures 396 in the upper plate 376 to T-connectors (not shown). Each T-connector connects to the rod end of one cylinder and the butt end of the other so that pressure in one line will cause the piston of one cylinder to extend and the other to retract.

In accordance with an important aspect of this embodiment, the structure 350 is designed to be compact in size, it preferably having a width of approximately 14 inches and a length of approximately 20 inches. The hydraulic cylinders are located substantially within the confines of the plates 376 and 378 and are therefore protected by the plates.

To sense the angular position of the tool bar 354 relative to the pull hitch 352, a hitch angle sensor is provided and is of the same construction as that illustrated and described in FIGS. 2, 7 and 8, with the components shown in FIG. 11 and 13 having the same identifying numbers, but with a prime (') designation. As shown the housing 64' is attached to the bushing assembly and is stationary. The arm 62' is attached to the plate 376 and therefore rotates relative to the housing when the pull hitch angular position changes with respect to the tool bar 354. As shown in FIG. 12, a wand sensor structure 84' is attached to the tool bar by U-bolts 398.

While the preferred embodiment and the above described alternative embodiment preferably employ the Hall effect sensors in combination with magnets, it is also contemplated that other sensors could be used in connection with the structure of sensor supports shown in FIGS. 4, 7, 8, 11, 12 and 13. In this regard, a linear voltage differential transducer arrangement in combination with an iron slug could be substituted for the Hall effect sensor-magnet combination. Such an arrangement would not have some of the advantages of the Hall effect sensor arrangement, and is believed to be more costly. While the linear voltage differential transducer arrangement may be somewhat more accurate, the degree of accuracy over the Hall effect sensor arrangement is believed to be unnecessary, and does not justify the increased costs.

From the foregoing description, it should be understood that an improved guidance control system for farm tractors and the like has been shown and described which has many superior attributes and advantages. The system has operational capabilities that contribute to its ease of operation, flexibility of adjustment and reliability.

While various embodiments of the present invention have been shown and described, it should be understood that various alternatives, substitutions and equivalents can be used, and the present invention should only be limited by the claims and equivalents thereof.

Various features of the present invention are set forth in the following claims.

What is claimed is:

1. Apparatus for positioning an implement being drawn by a tractor in a predetermined orientation relative to a desired path of movement, the tractor having a mounting hitch for the implement, said apparatus comprising:

hitch means adapted for attachment to the mounting hitch of the tractor and adapted to have the implement mounted thereto, said hitch means having hydraulic means for selectively retracting and extending each side of the hitch means generally horizontally relative to the mounting hitch of the tractor to thereby adjust the angular orientation of said hitch means relative to the mounting hitch;

first sensing means for sensing the angular orientation of said hitch means relative to the mounting hitch and generating a signal indicative of said sensed orientation, said first sensing means comprising a magnet means and a Hall effect sensing means, said Hall effect sensing means generating a signal that varies as a function of the proximity of the same and said magnet means, one of said Hall effect sensing means and said magnet means moving relative to the other as a result of horizontal pivoting of said hitch means;

wand means operatively associated with said apparatus and adapted to detect the lateral position of the implement relative to the desired path as the tractor moves generally along the desired path;

second sensing means for sensing the position of said wand means and generating a signal that is indicative of said sensed position, said second sensing means comprising a magnet means and a Hall effect sensing means, said Hall effect sensing means generating a signal that varies as a function of the proximity of the same and said magnet means, one of said Hall effect sensing means and said magnet means moving relative to the other as a result of lateral movement of said wand means;

warning means for alerting an operator in response to one of said first and second sensing means respectively detecting that one of said wand means and hitch means has moved to an extreme position during operation of the apparatus, said warning means including an audio indicating means, said audio indicating means being inhibiting from being activated by a predetermined time period after one of said first and second sensing means has detected that one of said wand means and hitch means has moved to an extreme position during operation of the apparatus; and, means for controlling said hydraulic means for adjusting the angular orientation of said hitch means so that the implement follows the desired path of movement in response to said signals from said first and second sensing means.

2. Apparatus as defined in claim 1 wherein said warning means is activated in response to said second sensing means having detected lateral movement in either direction beyond a predetermined amount.

3. Apparatus as defined in claim 1 wherein said warning means is activated in response to said first sensing means having detected angular movement of said hitch means in either direction a predetermined amount relative to the angular orientation of the mounting hitch of the tractor.

4. Apparatus as defined in claim 2 wherein said warning means comprises a visual display indicative of the lateral position of said wand means.

5. Apparatus as defined in claim 4 wherein said visual display has a distinctive color indication indicative of said second sensing means having detected lateral movement in either direction beyond said predetermined amount.

6. Apparatus as defined in claim 3 wherein said warning means comprises a visual display indicative of angular position of said hitch means.

7. Apparatus as defined in claim 3 wherein said visual display has a distinctive color indication indicative of said first sensing means having detected lateral movement in either direction beyond said predetermined amount.

8. Apparatus as defined in claim 1 wherein said predetermined time period is within the range of about 3 seconds to about 6 seconds.

9. Apparatus as defined in claim 1 further comprising limit detection circuitry operatively connected to said first sensing means and to said second sensing means for generating an out of limit signal in response to the magnitude of one of said sensed signals indicating that one of said wand means and hitch means has moved to an extreme position during operation of the apparatus.

10. Apparatus as defined in claim 1 further comprising:
means responsive to correction signals for operating said hydraulic means to selectively extend or retract at least one of the sides of the hitch means;
first circuit means for generating a feedback signal that is a combination of said signals from said first and second sensing means;
second circuit means for generating said correction signals for controlling said hydraulic means for adjusting the angular orientation of said hitch means so that the implement follows the desired path of movement in response to receiving said feedback signal from said first circuit means, said second circuit means initiating said correction signals when the feedback signal from said first circuit means deviates in either direction from a predetermined level by a first predetermined amount, said second circuit means terminating said correction signal in response to the signal from said first sensing means changing and said feedback signal from said first circuit means deviating from said predetermined level by a second predetermined amount that is greater than said first predetermined amount.

11. Apparatus as defined in claim 10 further including third circuit means for adjusting said predetermined level.

12. Apparatus as defined in claim 10 further including fourth circuit means for adjusting said first predetermined amount.

13. Apparatus as defined in claim 10 wherein said means for operating said hydraulic means comprises output circuit means responsive to said correction signals and at least one solenoid valve operable in response to signals received from said output circuit means, said output circuit means including a MOSFET transistor for controlling the generation of said signals generated thereby.

14. Apparatus as defined in claim 1 wherein said hitch means is horizontally pivotable generally about its midpoint and having at least one hydraulic cylinder with an extendable and retractable piston for selectively retracting and extending each side of the hitch means generally horizontally relative to the mounting hitch of the tractor to thereby adjust the angular orientation of the hitch means relative to the mounting hitch, said first sensing means further comprising:
an elongated lever arm operatively connected to said piston, said lever arm being pivotally mounted generally perpendicular to the piston whereby movement of the piston pivots said lever arm;
a first member mounted to the mounting hitch;
a second member adjacent said first member, said second member being attached to said lever arm and being pivotable therewith around an axis;
said magnet means being attached to one of said first and second members;
said Hall effect sensing means being attached to the other of said members in close proximity to said magnet means, said Hall effect sensing means being adapted to provide an electrical signal that varies as said second member is pivoted.

15. Apparatus as defined in claim 14 wherein the hitch means has a hydraulic cylinder located on each end portion thereof, each of the hydraulic pistons being connected to one end of a crank arm that is pivotable around a pin located between opposite ends thereof, the end opposite the first end having a pin for attachment to the tractor hitch, one end of said elongated lever arm being connected to the side of one of said crank arms, said first member being mounted to the side frame generally aligned with said pin, said pivot axis of said second member being generally aligned with said pin.

16. Apparatus as defined in claim 15 wherein said first member is generally cylindrical and has a cylindrical recess therein, said recess defining a cylindrical side wall and an end wall, said end wall having a concentric aperture therein, said recess being adapted to receive said second member therein, said second member being generally cylindrical and having a smaller diameter extension that protrudes through the end wall of said first member when said second member is placed within said recess, said lever arm being attached to said extension.

17. Apparatus as defined in claim 1 wherein said wand means includes a mounting structure and a rotatable shaft that is rotatable through a small predetermined angle of rotation, while substantially precluding axial movement thereof, said second sensing means comprising:
a first member operatively connected to the shaft and having an end portion that moves through a predetermined arc during rotation of the shaft through said predetermined angle of rotation;
a second member mounted in close proximity to first member;
said magnet means being attached to one of said first and second members;
said Hall effect sensing means being attached to the other of said members in close proximity to said magnet means, said Hall effect sensing means being adapted to provide an electrical signal that varies as a function of the angular position of said first member.

18. Apparatus as defined in claim 17 wherein one of said magnet means and said Hall effect sensing means is mounted on said first member and the other of said magnet means and said Hall effect sensing means is mounted at the end portion of said first member.

19. Apparatus as defined in claim 18 wherein said magnet means is mounted at the outer portion of said first member, and said Hall effect sensing means is mounted in said recess of said second member.

20. Apparatus as defined in claim 17 wherein said second member is mounted in a mounting structure having one or more walls, said second member being connected to said one or more outer walls at least at two locations, one of which comprises a pivot point, the other point being laterally adjustable to permit adjustment of the relative position of said magnet means and said Hall effect sensing means.

21. Apparatus for positioning an implement being drawn by a tractor in a predetermined orientation relative to a desired path of movement, the tractor having a mounting hitch for the implement, said apparatus comprising:
hitch means adapted for attachment to the mounting hitch of the tractor and adapted to have the implement mounted thereto, said hitch means having hydraulic means for selectively retracting and extending both sides of the hitch means in a generally horizontal direction relative to the mounting hitch of the tractor to thereby adjust the angular orientation of said hitch means relative to the mounting hitch;

means responsive to correction signals for operating said hydraulic means to selectively extend or retract at least one of the sides of the hitch means;

hitch sensing means for sensing the angular orientation of said hitch means relative to the mounting hitch and generating a signal indicative of said sensed orientation;

wand means operatively associated with said apparatus and adapted to detect the lateral position of the implement relative to the desired path as the tractor moves generally along the desired path;

wand sensing means for sensing the position of said wand means and generating a signal that is indicative of said sensed position;

first circuit means for generating a feedback signal that is a combination of said signals from said hitch sensing means and said wand sensing means;

second circuit means for generating said correction signals for controlling said hydraulic means for adjusting the angular orientation of said hitch means so that the implement follows the desired path of movement in response to receiving said feedback signal from said first circuit means, said second circuit means initiating said correction signals when the feedback signal from said first circuit means deviates in either direction from a predetermined level by a first predetermined amount, said second circuit means terminating said correction signal in response to the signal from said hitch sensing means changing and said feedback signal from said first circuit means deviating from said predetermined level by a second predetermined amount that is greater than said first predetermined amount.

22. Apparatus as defined in claim 20 further including third circuit means for adjusting said predetermined level.

23. Apparatus as defined in claim 21 further including fourth circuit means for adjusting said first predetermined amount.

24. Apparatus as defined in claim 21 wherein said hitch means is generally horizontally pivotable about the center portion thereof, said hitch sensing means comprising a magnet means and a Hall effect sensing means, said Hall effect sensing means generating a signal that varies as a function of the proximity of the same and said magnet means, one of said Hall effect sensing means and said magnet means moving relative to the other as a result of horizontal pivoting of said hitch means.

25. Apparatus as defined in claim 21 wherein said wand means is generally horizontally pivotable about the center portion thereof, said wand sensing means comprising a magnet means and a Hall effect sensing means, said Hall effect sensing means generating a signal that varies as a function of the proximity of the same and said magnet means, one of said Hall effect sensing means and said magnet means moving relative to the other as a result of horizontal pivoting of said hitch means.

26. Apparatus as defined in claim 21 wherein said means for operating said hydraulic means comprises output circuit means responsive to said correction signals and at least one solenoid valve operable in response to signals received from said output circuit means, said output circuit means including a MOSFET transistor for controlling the generation of said signals generated thereby.

27. Apparatus as defined in claim 21 wherein said hitch means is horizontally pivotable generally about its midpoint and having at least one hydraulic cylinder with an extendable and retractable piston for selectively retracting and extending each side of the hitch means generally horizontally relative to the mounting hitch of the tractor to thereby adjust the angular orientation of the hitch means relative to the mounting hitch, said hitch sensing means further comprising:

an elongated lever arm operatively connected to said piston, said lever arm being pivotally mounted generally perpendicular to the piston whereby movement of the piston pivots said lever arm;

a first member mounted to the mounting hitch;

a second member adjacent said first member, said second member being attached to said lever arm and being pivotable therewith around an axis;

a magnet means attached to one of said first and second members;

a Hall effect sensing means attached to the other of said members in close proximity to said magnet means, said Hall effect sensing means being adapted to provide an electrical signal that varies as said second member is pivoted.

28. Apparatus as defined in claim 27 wherein the hitch means has a hydraulic cylinder located on each end portion thereof, the piston of each hydraulic cylinder being connected to one end of a crank arm that is pivotable around a pin located between opposite ends thereof, the end opposite the first end having a pin for attachment to the tractor hitch, one end of said elongated lever arm being connected to the side of one of said crank arms, said first member being mounted to the side frame generally aligned with said pin, said pivot axis of said second member being generally aligned with said pin.

29. Apparatus as defined in claim 28 wherein said first member is generally cylindrical and has a cylindrical recess therein, said recess defining a cylindrical side wall and an end wall, said end wall having a concentric aperture therein, said recess being adapted to receive said second member therein, said second member being generally cylindrical and having a smaller diameter extension that protrudes through the end wall of said first member when said second member is placed within said recess, said lever arm being attached to said extension.

30. Apparatus as defined in claim 20 wherein said wand means includes a mounting structure and a rotatable shaft that is rotatable through a small predetermined angle of rotation, while substantially precluding axial movement thereof, said wand sensing means comprising:

a first member operatively connected to the shaft and having an end portion that moves through a predetermined arc during rotation of the shaft through said predetermined angle of rotation;

a second member mounted in close proximity to first member;

a magnet means attached to one of said first and second members;

a Hall effect sensing means attached to the other of said members in close proximity to said magnet means, said Hall effect sensing means being adapted to provide an electrical signal that varies as a function of the angular position of said first member.

31. Apparatus as defined in claim 30 wherein one of said magnet means and said Hall effect sensing means is mounted on said first member and the other of said magnet means and said Hall effect sensing means is mounted at the end portion of said first member.

32. Apparatus as defined in claim 31 wherein said magnet means is mounted at the outer portion of said first member, and said Hall effect sensing means is mounted in said recess of said second member.

33. Apparatus as defined in claim 32 wherein said second member is mounted in a mounting structure having one or more walls, said second member being connected to said one or more outer walls at least at two locations, one of which comprises a pivot point, the other point being laterally adjustable to permit adjustment of the relative position of said magnet means and said Hall effect sensing means.

34. Apparatus for positioning an implement attached to the rear portion of a tractor to maintain the implement in a predetermined orientation relative to a desired path during forward movement of the tractor through a field, the tractor having a mounting hitch for the implement and a hydraulic output, said apparatus comprising:
hitch means adapted for attachment to the mounting hitch of the tractor and adapted to have the implement mounted thereto, said hitch means being generally horizontally pivotable about the center portion thereof, said hitch means having hydraulic means adapted to be attached to the hydraulic output of the tractor, said hydraulic means being adapted to selectively retract and extend each side of the hitch means generally horizontally relative to the mounting hitch of the tractor in response to control signals being selectively applied thereto;
hitch sensing means for sensing the angular position of said hitch means relative to the tractor mounting hitch and generating a signal indicative of said sensed position, said hitch sensing means comprising a magnet means and a Hall effect sensing means, said Hall effect sensing means generating a signal that varies as a function of the proximity of the same and said magnet means, one of said Hall effect sensing means and said magnet means moving relative to the other as a result of horizontal pivoting of said hitch means;
pivotal wand means operatively connected to one of said apparatus and the implement for detecting the lateral position of the implement relative to the desired path as the tractor moves generally along the desired path;
wand sensing means for sensing the angular position of said wand means and generating a signal that is indicative of said sensed position, said wand sensing means comprising a magnet means and a Hall effect sensing means, said Hall effect sensing means generating a signal that varies as a function of the proximity of the same and said magnet means, one of said Hall effect sensing means and said magnet means moving relative to the other as a result of pivoting of said wand means;
means for generating said control signals for controlling said hydraulic means for adjusting the angular position of said hitch means so that the implement follows the desired path of movement in response to said signals from said hitch sensing means and said wand sensing means, and,
warning means for alerting an operator in response to one of said hitch sensing or wand sensing means respectively detecting that one of said wand means and hitch means has moved to an extreme position during operation of the apparatus, said warning means including an audio indicating means, said audio indicating means being inhibiting from being activated by a predetermined time period after one of said hitch sensing or wand sensing means has detected that one of said wand means and hitch means has moved to an extreme position during operation of the apparatus.

35. Apparatus as defined in claim 34 wherein said control signal generating means comprises:
first circuit means for generating a feedback signal that is a combination of said signals from said hitch sensing means and said wand sensing means;
second circuit means for generating said control signals for controlling said hydraulic means for adjusting the angular orientation of said hitch means so that the implement follows the desired path of movement in response to receiving said feedback signal from said first circuit means, said second circuit means initiating said control signals when the feedback signal from said first circuit means deviates in either direction from a predetermined level by a first predetermined amount, said second circuit means terminating said control signal in response to the signal from said hitch sensing means changing and said feedback signal from said first circuit means deviating from said predetermined level by a second predetermined amount that is greater than said first predetermined amount.

36. Apparatus for positioning an implement having a pull hitch that is adapted to be attached to a tractor and being of the type which has a generally transverse tool bar, the tractor having at least a center mounting hitch to which the pull hitch of the implement can be attached, said apparatus comprising:
hitch means adapted for attachment to the implement between the pull hitch and the tool bar thereof, said hitch means having hydraulic means for selectively retracting and extending each side of the tool bar generally horizontally relative to the pull hitch to thereby adjust the angular orientation of the pull hitch relative to the tool bar;
hitch sensing means for sensing the angular orientation of pull hitch relative to the tool bar and generating a signal indicative of said sensed orientation, said hitch sensing means comprising a magnet means and a Hall effect sensing means, said Hall effect sensing means generating a signal that varies as a function of the proximity of the same and said magnet means, one of said Hall effect sensing means and said magnet means moving relative to the other as a result of horizontal pivoting of the pull hitch relative to the tool bar;
wand means operatively associated with said apparatus and adapted to detect the lateral position of the implement relative to the desired path as the tractor moves generally along the desired path;
wand sensing means for sensing the position of said wand mean and generating a signal that is indicative of said sensed position, said wand sensing means comprising a magnet means and a Hall effect sensing means, said Hall effect sensing means generating a signal that varies as a function of the proximity of the same and said magnet means, one of said Hall effect sensing means and said magnet means moving relative to the other as a result of lateral movement of said wand means;

means for controlling said hydraulic means for adjusting the angular orientation of the tool bar relative to the pull hitch so that the implement follows the desired path of movement in response to said signals from said hitch sensing means and wand sensing means; and, warning means for alerting an operator in response to one of said hitch sensing or wand sensing means respectively detecting that one of said wand means and hitch means has moved to an extreme position during operation of the apparatus, said warning means including an audio indicating means, said audio indicating means being inhibiting from being activated by a predetermined time period after one of said hitch sensing or wand sensing means has detected that one of said wand means and hitch means has moved to an extreme position during operation of the apparatus.

37. Apparatus as defined in claim 36 wherein said hitch means has a horizontally pivotable portion attached to the pull hitch and a nonpivotable portion attached to the tool bar, said hitch means having at least one hydraulic cylinder with an extendable and retractable piston for selectively retracting and extending each side of the pivotable portion generally horizontally relative to the implement tool bar, said hitch sensing means further comprising:

an elongated lever arm operatively connected to said pivotable portion said lever arm being pivotably mounted generally perpendicular to the piston whereby movement of the pivotable portion pivots the lever arm:

a first member mounted to one of said nonpivotable portion of said hitch means;

a second member adjacent said first member, said second member being attached to said lever arm and being pivotable therewith around an axis;

said magnet means attached to one of said first and second members;

said Hall effect sensing means attached to the other of said members in close proximity to said magnet means, said Hall effect sensing means being adapted to provide an electrical signal that varies as said second member is pivoted.

38. Apparatus as defined in claim 37 wherein said first member is generally cylindrical and has a cylindrical recess therein, said recess defining a cylindrical side wall and an end wall, said end wall having a concentric aperture therein, said recess being adapted to receive said second member therein, said second member being generally cylindrical and having a smaller diameter extension that protrudes through the end wall of said first member when said second member is placed within said recess, said lever arm being attached to said extension.

39. Apparatus as defined in claim 36 wherein said wand means includes a mounting structure and a rotatable shaft that is rotatable through a small predetermined angle of rotation, while substantially precluding axial movement thereof, said wand sensing means comprising:

a first member operatively connected to the shaft and having an end portion that moves through a predetermined arc during rotation of the shaft through said predetermined angle of rotation;

a second member mounted in close proximity to first member;

said magnet means attached to one of said first and second members;

said Hall effect sensing means attached to the other of said members in close proximity to said magnet means, said Hall effect sensing means being adapted to provide an electrical signal that varies as a function of the angular position of said first member.

40. Apparatus as defined in claim 39 wherein one of said magnet means and said Hall effect sensing means is mounted on said first member and the other of said magnet means and said Hall effect sensing means is mounted at the end portion of said first member.

41. Apparatus as defined in claim 40 wherein said magnet means is mounted at the outer portion of said first member, and said Hall effect sensing means is mounted in said recess of said second member.

42. Apparatus as defined in claim 41 wherein said second member is mounted in a mounting structure having one or more walls, said second member being connected to said one or more outer walls at least at two locations, one of which comprises a pivot point, the other point being laterally adjustable to permit adjustment of the relative position of said magnet means and said Hall effect sensing means.

43. Apparatus as defined in claim 36 further comprising:

means responsive to correction signals for operating said hydraulic means to selectively extend or retract at least one of the sides of said pivotable portion of said hitch means;

first circuit means for generating a feedback signal that is a combination of said signals from said first and second sensing means;

second circuit means for generating said correction signals for controlling said hydraulic means for adjusting the angular orientation of said hitch means so that the implement follows the desired path of movement in response to receiving said feedback signal from said first circuit means, said second circuit means initiating said correction signals when the feedback signal from said first circuit means deviates in either direction from a predetermined level by a first predetermined amount, said second circuit means terminating said correction signal in response to the signal from said first sensing means changing and said feedback signal from said first circuit means deviating from said predetermined level by a second predetermined amount that is greater than said first predetermined amount.

44. Apparatus as defined in claim 43 further including third circuit means for adjusting said predetermined level.

45. Apparatus as defined in claim 43 further including fourth circuit means for adjusting said first predetermined amount.

46. Apparatus as defined in claim 36 further comprising limit detection circuitry operatively connected to said first sensing means and to said second sensing means for generating an out of limit signal in response to the magnitude of one of said sensed signals indicating that one of said wand means and hitch means has moved to an extreme position during operation of the apparatus.

47. Apparatus for positioning an implement having a pull hitch that is adapted to be attached to a tractor and being of the type which has a generally transverse tool bar, the tractor having at least a center mounting hitch to which the pull hitch of the implement can be attached, said apparatus comprising:

hitch means adapted for attachment to the pull hitch of the implement between the pull hitch and the tool bar, said hitch means having hydraulic means for selectively retracting and extending both sides of the pull hitch relative to the tool bar in a generally horizontal direction to thereby adjust the angular orientation of said pull hitch relative to the tool bar;

means responsive to correction signals for operating said hydraulic means to selectively extend or retract at least one side of the tool bar relative to the pull hitch;

hitch sensing means for sensing the angular orientation of said tool bar relative to the pull hitch and generating a signal indicative of said sensed orientation;

wand means operatively associated with said apparatus and adapted to detect the lateral position of the implement relative to the desired path as the tractor moves generally along the desired path;

wand sensing means for sensing the position of said wand means and generating a signal that is indicative of said sensed position;

first circuit means for generating a feedback signal that is a combination of said signals from said hitch sensing means and said wand sensing means;

second circuit means for generating said correction signals for controlling said hydraulic means for adjusting the angular orientation of said hitch means so that the implement follows the desired path of movement in response to receiving said feedback signal from said first circuit means, said second circuit means initiating said correction signals when the feedback signal from said first circuit means deviates in either direction from a predetermined level by a first predetermined amount, said second circuit means terminating said correction signal in response to the signal from said hitch sensing means changing and said feedback signal from said first circuit means deviating from said predetermined level by a second predetermined amount that is greater than said first predetermined amount.

48. Apparatus as defined in claim 47 further including third circuit means for adjusting said predetermined level.

49. Apparatus as defined in claim 47 further including fourth circuit means for adjusting said first predetermined amount.

50. Apparatus as defined in claim 47 wherein said hitch means has a horizontally pivotable portion attached to the pull hitch and a nonpivotable portion attached to the tool bar, said hitch means having at least one hydraulic cylinder with an extendable and retractable piston for selectively retracting and extending each side of the pivotable portion generally horizontally relative to the implement tool bar, said hitch sensing means comprising a magnet means and a Hall effect sensing means, said Hall effect sensing means generating a signal that varies as a function of the proximity of the same and said magnet means, one of said Hall effect sensing means and said magnet means moving relative to the other as a result of horizontal pivoting of said pivotable portion of said hitch means.

51. Apparatus as defined in claim 47 wherein said wand means is generally horizontally pivotable about the center portion thereof, said wand sensing means comprising a magnet means and a Hall effect sensing means, said Hall effect sensing means generating a signal that varies as a function of the proximity of the same and said magnet means, one of said Hall effect sensing means and said magnet means moving relative to the other as a result of horizontal pivoting of said hitch means.

52. Apparatus for determining the angular position of a hitch means that has a horizontally pivotable portion attached to a pull hitch of an implement and a nonpivotable portion attached to a transverse tool bar of the implement, said hitch means having at least one hydraulic cylinder with an extendable and retractable piston for selectively retracting and extending each side of the pivotable portion generally horizontally relative to a generally nonpivotable portion, said apparatus comprising:

an elongated lever arm operatively connected to said nonpivotable portion and being pivotally mounted generally perpendicular to the piston whereby movement of the piston pivots said lever arm;

a first member mounted to the pull hitch;

a second member adjacent said first member, said second member being attached to said lever arm and being pivotable therewith around an axis;

a magnet means attached to one of said first and second members;

a Hall effect sensing means attached to the other of said first and second members in close proximity to said magnet means, said Hall effect sensing means being adapted to provide an electrical signal that varies as said second member is pivoted.

53. Apparatus as defined in claim 52 wherein the hitch means has a hydraulic cylinder located on each end portion thereof, each of the hydraulic pistons being connected to one end of a crank arm that is pivotable around a pin located between opposite ends thereof, the end opposite the first end having a pin for attachment to the tractor hitch, one end of said elongated lever arm being connected to the side of one of said crank arms, said first member being mounted to the side frame generally aligned with said pin, said pivot axis of said second member being generally aligned with said pin.

54. Apparatus as defined in claim 53 wherein said first member is generally cylindrical and has a cylindrical recess therein, said recess defining a cylindrical side wall and an end wall, said end wall having a concentric aperture therein, said recess being adapted to receive said second member therein, said second member being generally cylindrical and having a smaller diameter extension that protrudes through the end wall of said first member when said second member is placed within said recess, said lever arm being attached to said extension.

55. Apparatus as defined in claim 54 wherein one of said magnet means and said Hall effect sensing means is mounted in said recess of said first member and the other of said magnet means and said Hall effect sensing means is mounted at the outer portion of said second member.

56. Apparatus as defined in claim 55 wherein said magnet means is mounted at the outer portion of said second member, and said Hall effect sensing means is mounted in said recess of said first member.

57. Apparatus as defined in claim 56 wherein said extension of said second member contains an annular groove at the location of said end wall of said first member, said apparatus including a resilient O-ring seal located in said groove.

58. Apparatus for controlling the horizontal angular orientation of a pull hitch of an implement of the type which has a generally transverse tool bar, said apparatus controlling the angular orientation of the pull hitch relative to the orientation of the tool bar of the implement, said apparatus comprising:
- a first frame member including a generally vertically oriented end portion and having at least one generally horizontal plate portion secured thereto and extending therefrom, said first frame member being adapted for attachment to the center portion of the tool bar of the implement;
- a second frame member including a generally vertically oriented end portion and at least one generally horizontal plate portion secured thereto and extending therefrom, said second frame member being adapted for attachment to said pull hitch;
- means for connecting said first and second frame members together whereby said first and second frame members are pivotable relative to one another through a predetermined arc in a generally horizontal plane; and,
- power means for pivoting said first and second frame members relative to one another, said power means comprising at least one hydraulic cylinder having an extendable and retractable piston, said piston being connected to one of said first and second frame members and said cylinder being connected to the other of said first and second frame members so that extension and retraction of said piston pivots said first and second frame members relative to one another, said cylinder being positioned adjacent said connecting means, and generally aligned in the direction of the pull hitch;
- the width of said first and second frame members being only slightly greater than the width of the pull hitch, to thereby confine the volume of the apparatus to that which would generally be occupied by the pull hitch itself.

59. Apparatus as defined in claim 58 wherein said power means comprises two hydraulic cylinders, said cylinders being positioned on opposite sides of said connecting means, said cylinders being connected such that retraction of the piston of one cylinder occurs during extension of the piston of the other cylinder.

60. Apparatus as defined in claim 58 wherein said predetermined arc is approximately 13 degrees.

61. Apparatus as defined in claim 59 wherein said first frame member comprises upper and lower generally horizontal plate portions spaced from one another and extending from said end portion thereof, and at least one ear attached to said end portion for attachment to one of said piston and cylinder on opposite sides of said connection means.

62. Apparatus as defined in claim 61 wherein said second frame member comprises upper and lower generally horizontal plate portions spaced from one another and extending from said end portion thereof, and at least one ear attached to said end portion for attachment to one of said piston and cylinder on opposite sides of said connection means.

63. Apparatus as defined in claim 62 wherein said connection means comprises an elongated hollow cylindrical sleeve located adjacent said end portion of said first frame member and extending between said upper and lower plate portions of said second frame member and a shaft extending through apertures in said upper and lower plate portions of said first frame member and said sleeve, so that said first and second frame members are pivotable relative to one another.

64. Apparatus as defined in claim 62 wherein said cylinders are substantially located within the area between said first and second plate portions of said second frame member.

65. Apparatus as defined in claim 58 wherein the outer horizontal dimensions thereof are approximately 14 inches wide by 20 inches long.

66. Apparatus as defined in claim 58 wherein the main implement frame of the implement comprises an elongated tool bar to which other implement structure is mounted, said first frame member being attached to said tool bar.

67. Apparatus as defined in claim 58 further comprising means attached to at least one of said frame members and operatively associated with the other for sensing the relative horizontal angular position of one of said first and second frame members relative to the other.

68. Apparatus adapted for use on a farm implement of the type which has an elongated pull hitch for attachment to a tractor, and a main implement frame located rearwardly of the pull hitch, which apparatus has the capability of adjusting the horizontal angular orientation of the pull hitch relative to the main implement frame, said apparatus comprising:
- a first frame member including a generally vertically oriented end portion and having at least one generally horizontal plate portion secured thereto and extending therefrom, said first frame member being adapted for attachment to the outside of the center portion of said main implement frame;
- a second frame member including a generally vertically oriented end portion and at least one generally horizontal plate portion secured thereto and extending therefrom, said second frame member being adapted for attachment to the pull hitch;
- means located adjacent the end portion of one of said first and second frame members for pivotably connecting said first and second frame members together whereby said first and second frame members are pivotable relative to one another through a predetermined arc in a generally horizontal plane; and,
- power means substantially located within the boundaries of the width and length of said first and second frame members, said power means being operatively connected to said first and second frame members for pivoting said first and second frame members relative to one another;
- the width of said first and second frame members being only slightly greater than the width of the pull hitch, to thereby confine the volume of the apparatus to that which would generally be occupied by the pull hitch itself.

69. Apparatus as defined in claim 68 wherein each of said first and second frame member include upper and lower plate portions spaced from one another, said power means comprising hydraulic cylinders having extendable and retractable pistons, said hydraulic cylinders being located between said upper and lower plate portions of said first and second frame members on opposite sides of said connection means, said piston of each cylinder being connected to one of said first and second plate portions and said cylinder being connected to the other of said first and second plate portions.

* * * * *

UNITED STATES PATENT AND TRADEMARK OFFICE
CERTIFICATE OF CORRECTION

PATENT NO. : 5,170,849

DATED : December 15, 1993

INVENTOR(S) : Nikkel et al.

It is certified that error appears in the above-identified patent and that said Letters Patent is hereby corrected as shown below:

```
Column 17, line 35, change "20" to --21--.
Column 18, line 49, change "20" to --21--.
Column 20, line 62, change "mean" to --means--.
```

Signed and Sealed this

Thirtieth Day of November, 1993

Attest:

BRUCE LEHMAN

Attesting Officer

Commissioner of Patents and Trademarks